US 6,461,150 B1

(12) United States Patent
Sirand (10) Patent No.: US 6,461,150 B1
(45) Date of Patent: Oct. 8, 2002

(54) VERY LOW PRESSURE GAS-FIRED OVERHEAD RADIANT HEATER WITH ATMOSPHERIC PRIMARY AIR SUPPLY BY MEANS OF A VENTURI

(75) Inventor: Joseph Sirand, Laplume (FR)

(73) Assignee: Centre D'Etude et de Realisation D'Equipment et de Materiel (CEREM), Laplume (FR)

(*) Notice: Subject to any disclaimer, the term of this patent is extended or adjusted under 35 U.S.C. 154(b) by 0 days.

(21) Appl. No.: 09/697,516

(22) Filed: Oct. 27, 2000

(30) Foreign Application Priority Data

Oct. 29, 1999 (FR) .............................. 99 14080
Jul. 11, 2000 (FR) .............................. 00 09015

(51) Int. Cl.⁷ .......................... F23D 14/14; F23D 14/46
(52) U.S. Cl. ...................................... 431/329; 431/328
(58) Field of Search ............................. 431/326, 328, 431/329; 126/92 R, 92 AC, 92 B, 85 A (56) References Cited

U.S. PATENT DOCUMENTS

| 1,368,120 A | * | 2/1921 | Cole |
| 3,343,586 A | * | 9/1967 | Berchtold et al. |
| 3,833,338 A | * | 9/1974 | Badrock |
| 3,857,670 A | | 12/1974 | Karlovetz et al. |
| 3,975,140 A | * | 8/1976 | Placek |
| 4,039,275 A | | 8/1977 | McGettrick |
| 4,452,225 A | * | 6/1984 | Plant |
| 5,060,629 A | * | 10/1991 | Sirand |
| 5,203,689 A | * | 4/1993 | Duggan et al. |
| 5,474,443 A | * | 12/1995 | Viessmann et al. |
| 5,540,213 A | * | 7/1996 | Shell et al. |
| 5,931,660 A | * | 8/1999 | Amrhein et al. |
| 6,199,547 B1 | * | 3/2001 | Gaudin |

FOREIGN PATENT DOCUMENTS

| CH | 371 237 | | 9/1963 | |
| DE | 43 41 126 | * | 6/1995 | ................. 431/328 |
| DE | 195 19 897 | * | 12/1995 | ................. 431/328 |
| DE | 195 47 962 | | 6/1996 | |
| DE | 93 21 418 | | 1/1998 | |
| EP | 0 476 299 | * | 8/1991 | ................. 431/328 |
| EP | 0 816 758 | * | 1/1998 | ................. 431/329 |
| EP | 0 950 853 A2 | | 4/1999 | |
| FR | 1 577 719 | | 8/1969 | |
| WO | WO 98/53249 | * | 11/1998 | ................. 431/7 |

* cited by examiner

Primary Examiner—Carl D. Price
(74) Attorney, Agent, or Firm—Young & Thompson (57) ABSTRACT

Infrared emitter with luminous radiation for a supply of gas at very low pressure and of primary atmospheric air via venturi, said supply comprising at least one gas injector, an injector holder, a safety valve, a gas supply connector, especially for raised heating appliances for directional heating towards the ground and/on the sides in the agricultural, industrial, craft and service sectors, characterized in that it comprises:

a geometrical structure comprising at least one first (1), second (2), third (4) and fourth (5) concentric enclosure, a substantially horizontal upper plate (6) below which the said at least first (1), second (2), third (4), fourth (5) enclosures are fixed concentrically to said plate, fitting the one inside the other, a central opening (7) leading the air-gas flow perpendicularly to said plate, into the interior space created by the first enclosure (1).

3 Claims, 8 Drawing Sheets

VERY LOW PRESSURE GAS-FIRED OVERHEAD RADIANT HEATER WITH ATMOSPHERIC PRIMARY AIR SUPPLY BY MEANS OF A VENTURI

BACKGROUND OF THE INVENTION

1. Field of the Invention

The invention relater to a raised emitter of a gas heating appliance for infrared and luminous radiation for directional heating, capable of supplying at very low pressures of gas supply a raised radiation output. This emitter is intended for heating appliances for surfaces in industrial locations, craft. agriculture and service locations and for every use in the open air or partly in the open air.

2. Description of the Related Art

In the current state of the art, heating appliances which have an emitter of infrared radiation are used now, certain of which have a very good radiation output such as that described in document EP 0 382 286 in the name of the applicant. Nevertheless, obtaining this high output is conditioned by a nominal pressure of gas supply substantially greater than that provided for the emitter which is the object of the invention.

Other appliances have a good output at a low pressure of gas supply, These are classic radiants with perforated plates formed from refractory ceramics. These plates are crossed by the air-gas mixture entering via one face, bursting into flame and radiating on the other face. The limiting factor of the use of these appliances with ceramic plates it their lack of adaptation to dusty environments because cleaning them is difficult and washing them in water is not compatible with ceramic plates, The disadvantage of these plates is also their fragility and every cracked plate must be changed for fear of communicating the flame to the internal face of this plate. Poor resistance to airflows must also be added.

Finally there also exist appliances which are entirely metallic and function according to the same scheme as the appliances with ceramic plates, the latter being replaced by a sheet of thin and finely perforated metallic netting. The position of this netting should deviate very little from the horizontal especially because of the fact that if the appliance is inclined, the air-gas flow arriving from the top to the bottom, on the internal side, in the middle of the sheet of netting, the lower half of the netting does not receive, on the internal side, any more than a tiny portion of the fuel-oxidiser mixture and the combustion on the external side becomes insignificant over all this lower halt which does not redden. By contrast, the top half receiving twice its requirement of the mixture of fuel-oxidiser, abnormal overheating is noted. Now the interest of a downwardly directional infrared emitter is not to be limited to a restricted zone close to the vertical, but to be able to provide oblique radiation of greater amplitude in the desired directions.

To attempt to reduce this disadvantage of a netting which is too hot over one half and too dark over the other, there is certainly provided, on the internal side, a netting with a larger mesh, parallel to the radiation netting, to spread out the flow. If the result is partially achieved when one departs no more than a few degrees from the horizontal position, the effect is practically zero on the radiation netting in the oblique position.

Finally the fact that there is only provided on this type of emitter a single finely perforated netting for a radiation surface corresponding to the nominal value of the power of the appliance. makes this type of appliance scarcely prone to bearing a temperature level corresponding to a very interesting portion of the infrared wavelengths with good radiation output. Experience shows that a single metallic netting, heated to more than 700° C. and receiving an air-gas flow at low speed (as a result of the low pressure), is not capable of combating effectively the risk of catching fire internally.

Finally for all the appliances mentioned above, the resistance to airflows is a factor which limits in practice their use to an air speed of the order of 1 meter/second at the maximum.

SUMMARY OF THE INVENTION

The present invention also intends to overcome the disadvantages of these heating appliances with infrared emitters and in particular when it is required to use a very low pressure as a nominal value, lower than 50 mbar.

Another objective of the invention is to obtain on perforated refractory walls which are inoxidizable and non-porous, oblique or vertical:

perfectly distributed radiation;

high-temperature infrared emission to enjoy a raised radiation output, i.e. a high percentage of radiated heat in relation to the total heat produced.

The objective should then be, to ensure great reliability in functioning at high temperature, to combine adequate conditions for the temperature to be as high as possible at the external surface of the emitter whilst being more moderate in the interior, but nevertheless sufficient to ensure the pyrolysis of organic dusts.

Another objective of the invention is to permit, via the inoxidizable and non-porous nature of the emitter, washing in water, both internally and externally.

Finally, as will be shown further on, the design of the structure of the invention makes it possible to achieve two supplementary objectives;

silent functioning, a great resistance to wind.

The infrared emitter according to the invention is thus suitable for numerous applications when the available gas source can or should be delivered only at a very low pressure, whether these be constraints specific to certain distribution networks, constraints imposed by respecting regulations or even constraints of partial replacement of existing appliances, in complete installations designed for very low pressures, i.e. for pressures generally of between 15 and 50 mbar. These applications relate to numerous fields in which a raised heating device operating with a directional infrared emitter is at the same time the most widespread and the most economic solution in agriculture, industry, the service sector and other sectors.

More precisely, the invention consists in an infrared emitter with luminous radiation for a supply of gas at very low pressure and of primary atmospheric air via venturi, said supply comprising at least one gas injector, an injector holder, a safety valve, a gas supply connector, especially for raised heating appliances for directional heating towards the ground and/or on the sides in the agricultural, industrial, craft and service sectors, characterized in that it comprises:

a geometrical structure comprising at least one first, second, third and fourth concentric enclosures, a substantially horizontal upper plate below which the said at least first, second, third, fourth enclosures are fixed concentric with said plate, the one fitting inside the other, a central opening leading the air-gas flow perpendicularly to said plate, into the interior space created by the first enclosure.

According to another feature, the emitter according to the invention comprises a fifth enclosure which is also concentric and which can be inserted between the second and third enclosures according to the gas supply pressure conditions and the instability of the ambient air of the environment.

According to another feature, the emitter according to the invention comprises a first, second, third and fourth enclosure, the second enclosure then fulfilling the functions equivalent to those ensured by the conjunction of the second and fifth enclosures of the emitter, according to the above features, all these enclosures having on a surface of revolution over 360°, lateral, oblique, vertical or hemispherical walls formed from an inoxidizable refractory material which is permeable and non-porous and which turns red with heat.

According to another feature, the emitter according to the invention comprises a supply of the air-gas flow directed from the top to the bottom, and an integral central opening in said plate, then open in its centre, airtight with the plate, leading the air-gas flow perpendicularly to said plate via the central opening of the latter into the interior space created by the first enclosure.

According to another feature, the emitter according to the invention comprises a supply of the air-gas flow directed from the bottom to the top and a central opening contiguous with the second and third enclosures and loading the air-gas flow perpendicularly to the upper plate, then full in its centre, into the interior space created by the first enclosure.

According to another feature, the lateral walls of the second, fifth and third enclosures are kept spaced by spacing means such as raised ribs formed on these enclosures, keeping them at a controlled distance the one from the other and serving them as strengtheners against heat deformation without obscuring the luminous emission at the contact lines of the reliefs, this spacing distance being moreover limited to the passage of a thin layer of dynamic flow making its way through the holes of the specific perforated walls firstly of the second and fifth enclosures, and secondly of the fifth and third enclosures.

According to another feature, the distribution enclosure in its truncated-cone, cylindrical or hemispherical shape, comprises in its internal volume, according to the central vertical axis of symmetry, a solid or very finely perforated cone, apex towards the top at the outlet for the arrival of the air-gas flow, thus giving in combination with the first enclosure in the above shapes an equivalent means of perfect distribution of the air-gas flow to that obtained directly with the first enclosure, apex towards the bottom of the conical shape.

According to another feature, the distribution enclosure for the truncated-cone, cylindrical or hemispherical shapes, comprises in its internal volume, according to the central vertical axis of symmetry, a solid cone of pre-distribution, base towards the plate and apex towards the bottom at the outlet for the arrival of the air-gas flow, thus becoming in combination with the first enclosure in the above shapes a means of perfect distribution of the air-gas flow.

BRIEF DESCRIPTION OF THE DRAWINGS

Other features and advantages will appear in reading the description which follows of several examples of embodiments of the emitter according to the invention, accompanied by the annexed drawings, these examples being given by way of non-restrictive illustration.

DESCRIPTION OF THE PREFERRED EMBODIMENTS

Figure 1:
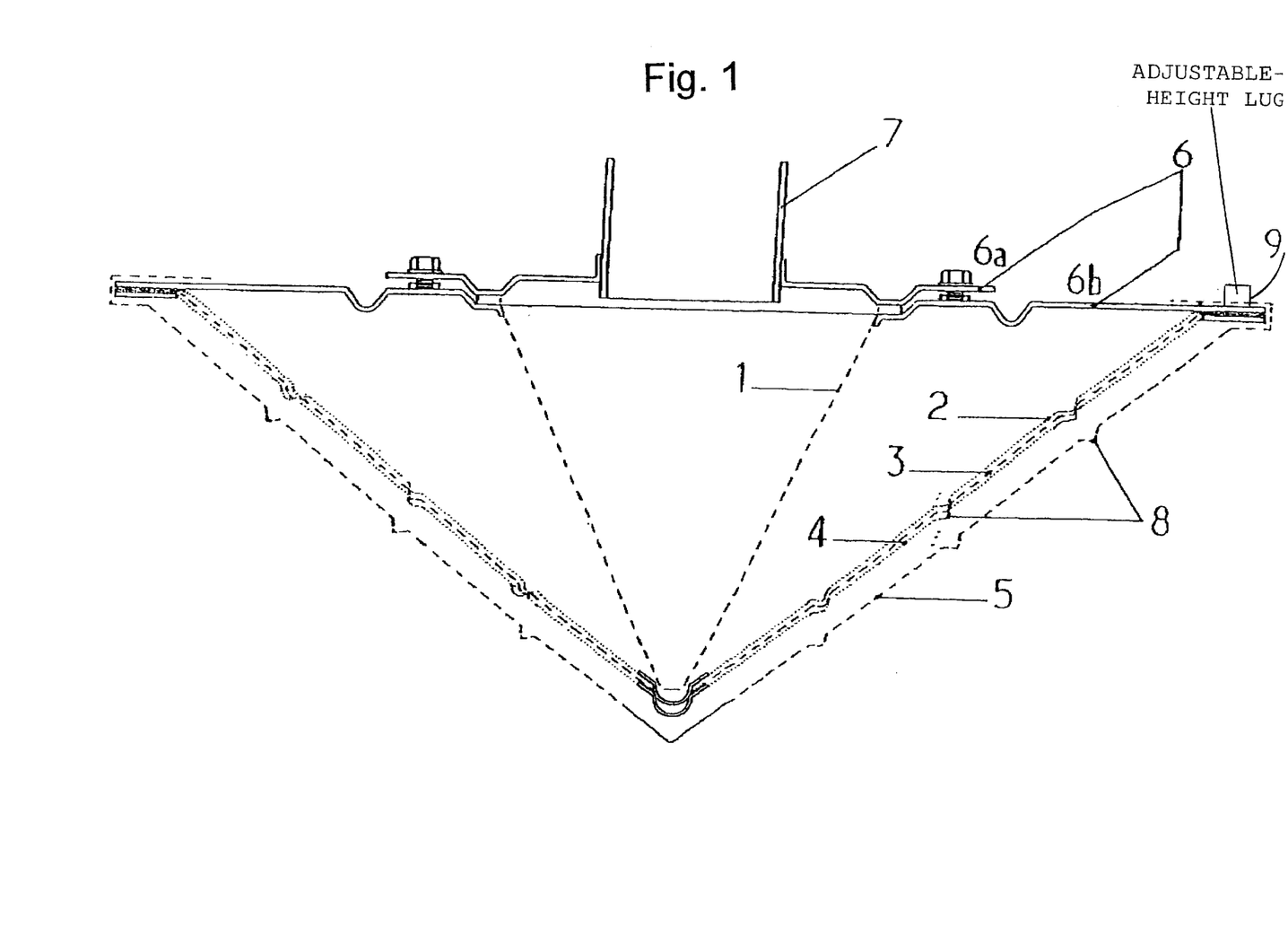
FIG. 1 is a schematic cross-sectional view of a first embodiment of an emitter according to the invention.

FIG. 1 gives an embodiment according to a conical geometry with the apex towards the bottom, comprising five concentric enclosures formed in this example from refractory metal sheet, perforated in a specific manner according to the role played by each enclosure.

Enclosure 1 is a first distributor of the air-gas mixture intended to explode this flow in a uniform manner in the direction of all the points of the internal surface of enclosure 2.

Enclosure 2 is simultaneously a diffuser of the air-gas mixture distributed by enclosure 1 and a flame trap barrier thus avoiding the possibility of fire taking hold in the injector. This enclosure 2 also ensures a first pyrolysis of the dusts of the primary air supplied by the air-gas flow.

Enclosure 3 will be described after enclosure 5.

Enclosure 4 is identical to enclosure 2 but its function is different: it is at the level of its external wall that the combustion of the air-gas mixture is established and the infrared emission starts.

Enclosure 5 is called the enclosure of confinement and of amplification of the infrared emission, It fulfills a known function, especially in the appliances with ceramic plates, of recovering the lost heat but also a new function of very significant amplification of the infrared emission of enclosure 4 as a result of the nature and the design of these two enclosures described further on.

Enclosure 3 is a thermal protection enclosure providing a screen between enclosures 2 and 4 so as to moderate the level of temperature coming from 4 in the direction of 2. To illustrate the role of enclosure 3, it is a matter of limiting, for example to 700° C., the temperature of surface 2 when surface 4 is heated to 900° C. The screen constituted by enclosure 3, reduces by its very presence to 800° C. its own temperature received from enclosure 4 and thus limits to 700° C. the temperature of enclosure 2, thus avoiding too strong reddening of the latter and not compromising its role as a barrier against internal combustion. Nevertheless this reddening is sufficient to ensure a first pyrolysis of the dusts of the primary air as indicated above.

Moreover, enclosure 3 acts in relation to enclosure 4 as a finishing device for perfect distribution.

Despite the severe handicap of a gas supply with very low nominal pressure in an atmospheric burner (without mechanical supply of combustion air), the infrared emitter according to the invention proves capable of fulfilling the numerous conditions without which the following requirements are not obtained:

homogeneity of distribution, including on oblique or vertical walls of the air-gas flow introduced, which is ensured by the distribution enclosure 1, uniformity of the distribution of the flow thus distributed through the diffusion enclosure 2 then the screen enclosure 3, total regularity of the thin layer of air-gas flow entering into combustion as it leaves the perforations of the external surface of the enclosure of infrared emission 4 and consequently a balanced reddening of each joint of this emission surface, thermal over-excitation of the emission enclosure 4 by the confinement enclosure 5 which in its turn becomes an auxiliary surface enhancing the infrared emission of enclosure 4, an efficiency of the secondary convection air taking part in combustion in the space between enclosures 4 and 5; indeed the secondary convection air, around the infrared emission surface 4, not only encounters a medium taken to a high temperature (900° C.), but benefits at this temperature from a combustion contact surface greater than 20 to 25% of that from emitting surfaces of prior art, an electromagnetic spectrum of infrared radiation emitted by the refractory surf aces thus disposed, the wavelengths of which sought in the applications are those contained in the infrared termed "close" to that received from the sun, a radiation output (radiated power/nominal power in %) which can reach 70%.

The detailed, but in no way restrictive, description of the preferred embodiments using perforated sheets of refractory metal is based on the sectional drawing of FIG. 1. In the embodiment described here, a tube 7 carries from the top to the bottom the flow of the air-gas mixture towards the interior of a series of five enclosures 1, 2, 3, 4, 5, in the form of a cone formed from fine refractory, perforated steel sheets, the one fitting inside the other, apex towards the bottom.

This tube 7 is an integral part of an upper plate 6, comprising for constructional reasons two integral elements 6a and 6b. The tube opens out under plate 6a via a central hole, formed in this plate, of the game diameter as that of the tube, The junction tube/plate is airtight.

The arrangement of the tube 7 in the geometries in which said tube conducts the flow of the air-gas mixture from the bottom to the top, towards the series of five enclosures already mentioned, will be described further on.

In the described embodiment as in all the other versions explained further on, the five enclosures, 1, 2, 3, 4, 5 are fixed by their base concentric with the circular plate 6.

With regard to enclosure 1: this is the distributor of the air-gas flow entering via tube 7, This enclosure 1 should have the following characteristics:

its base which is concentric with the outlet of the tube rests against plate 6 over all its perimeter;

its height occupies the total available distance between the plate 6 and the top of the enclosures fitting inside one another as described below;

its surface of revolution, perforated, is determined by its diameter at the base and the height mentioned above;

its diameter at the base is determined in dependence on the angle at the apex sought so that the air-gas flow passing through the perforations is distributed in a uniform manner, in terms of quantity and direction, towards the internal wall of the diffusion enclosure 2; the percentage of perforation is determined in dependence on:

the nominal rate of air-gas flow necessary, a minimal braking of the speed of this flow in order to permit it to reach in the beat conditions of kinetic energy the internal face of the diffusion enclosure 2, on the other hand, the diameter of the perforations of enclosure 1 should not constitute any blockage for the passage of the dust admitted with the flow of air (primary)—gas and should thus be sufficient not to risk any trapped accumulation of the dust sucked in. In the non-restrictive embodiment described, the result sought is obtained with a distributor, the characteristics of which are the following size orders: for a diameter of the arrival tube for the air-gas flow with a cross-section S1:

the cross-section S2 of the base of the distributor 1 is S2=S1×6, with a range from S1×4 to S1×6;

the angle at the apex is 60°, for a surface of revolution S3 of the diffusion enclosure 2;

the surface of revolution S4 of the distributor 1 is S4=S3×¼ with a range from S3×¼ to S3×⅕; and for the surface of revolution S4 of the distributor 1, the percentage of perforation is S4×40% with holes which are 2 mm in diameter in diameter and in a range of 3 to 3.5 $mm^2$ of unit cross-section.

This distribution enclosure 1 is never in contact via its external face with the inflamed mixture. Contrary to the integral interior cone in the tube, described in document EP 0382206 in the name of the applicant, it does not fulfill the same function. This is the reason why the size of the diameter of the perforations of the distributor 1 can be very substantially greater in order not to be an obstacle to the free passage of the particles of the ambient air and of a flow at very low pressure.

It should be noted also that the interior space between the distributor 1 and the diffusion enclosure 2 is a "cold" zone. This gives the advantage of a moderated temperature of the air-gas flow and thug of a non-disrupted density, as well as a temperature of the plate 6 which is substantially lower then that very high temperature of the infrared emission surface 4.

For this reason, the tube 7 for the arrival of the air-gas flow and, upstream, the standard components such as S venturi, primary air inlet nozzle, injector holder, injector, safety valve etc, . . . don't have to suffer, by conduction, from a raised heat.

With regard to enclosure 2: this is the enclosure of diffusion of the air-gas flow received in a homogenous fashion in terms of quantity and direction from the distributor 1.

This is also a flame trap barrier (catching fire in the injector and internal combustion).

The holes with which this enclosure is perforated have in this view a unit cross-section of between 0.50 and 0.70 $mm^2$. Indeed, the low speed of ejection of the air-gas flow diffused through these holes makes a more significant cross-section imprudent with regard to the flame trap function.

In another perspective, which should be taken into account, these holes should have a minimum cross-section of 0.50 $mm^2$: indeed this enclosure 2 ensuring also, as indicated before, a first pyrolysis of the ambient dusts thanks to its temperature in the order of 700° C., it is appropriate to counteract the propensity of the mineral ashes of the pyrolysed dusts to accumulate on the surrounds of the holes. Too low a unit cross-section of these holes would on the one hand impede the elimination of these ashes and on the other hand would reduce the efficiency of the diffusion function.

The flame trap function of this enclosure 2 leads moreover to an airtight fixing of the base of this enclosure a to the upper plate 6 and to the same airtightness at the level of the seams from shaping its wall of revolution.

Finally: as regards the ratio of the surface of revolution of enclosure 2 in relation to the distribution enclosure 1, the construction should be such as:

surface of enclosure 2 surface of enclosure 1×4 with a range from 1×4 to 1×5.

As regards the ratio of the perforated surface:

perforated surface of enclosure 2=perforated surface of enclosure 1×2.5 with a range from 1×2 to 1×3.

With regard to enclosure 3: this is the thermal protection and first confinement enclosure inserted between the diffusion and flame trap barrier enclosure 2 and the infrared emission enclosure 4. It should be noted that enclosure 4, having, as described further on, a perforated surface identical to that of enclosure 2, itself behaves like a first flame trap barrier but with insufficient safety as a result of its high temperature. The interposition of enclosure 3 between the two enclosures 4 and 2, multiplies the safety as a flame trap by lowering the temperature of enclosure 2 to about 700° C. maximum.

On the other hand, it contributes to raising the emission temperature of enclosure 4, the space between enclosures 3 and 4 being the seat of an effect of return heat from enclosure 4, which increases the emissive power of the letter.

The use of this precautionary enclosure 3 as thermal protection for enclosure 2, grows with the reduction of the nominal pressure of the gas which should feed the emitter which is the subject of the present description. The lower the diffusion speed, the more the risk increases of the flame returning to an enclosure 2, too hot and not protected.

This use grows also and particularly when the emitter is used in an environment subject to airflows.

The mechanical action of these disturbances of the external air is capable of provoking, without the protective wall 3, a return blast capable of crossing the wall of enclosure 2 and of thus causing internal combustion.

In summary, if the gas pressure is sufficient and if the environment is a perfectly stable atmosphere, it can be envisaged that no enclosure 3 is disposed between enclosures 2 and 4, if the conditions of pressure and of environment indicated above are not firmly ensured, there is a contra-indication not to provide the enclosure 3 of thermal protection and first confinement.

The dimensions of the protection enclosure 3 are identical to those of enclosure 2. On the other hand, its wall is perforated according to a percentage of empty space 1.2 to 1.6 times more significant than that of the wall of the diffusion enclosure 2. In the embodiment described, the empty portions of enclosure 3 are perforations with a diameter of 2 mm with a range of basic cross-section of the order of 3 to 4 mm², or of clearly more significant cross-section than the perforations of the diffusion enclosure 2 which are 0.8 mm. This with the intention of not substantially checking the passage of the air-gas flow towards the infrared emission enclosure 4.

This enclosure 3 does not require the necessity of "tight" fixing to the upper plate and to its seams. However in the embodiment described it is crimped in the upper plate between the edges of enclosures 2 and 4 for manufacturing convenience. The spacing between the walls of enclosures 2, 3 and 4 should be regular. This spacing is limited as a result of the low gas pressure which only induces a thin dynamic layer of the air-gas flow destined to cross the three walls of the enclosures 2, 3, 4. For a gas pressure of 20 to 30 mbar, good spacing of these enclosures is around 1.5 mm.

The regularity of this spacing between the walls can be obtained as in the embodiment described, by raised ribs 8 stamped on these walls. Nesting the enclosures one inside the other stops at the level of the contact of a the relief of the ribs, the height of this relief being calculated to give the desired value of the spacing between the walls, It goes without saying that any other equivalent means can be used to this end. The interest of the raised ribs and successive horizontal crowns, such as represented on FIG. 1, is to ensure in terms of the construction of the appliance a rigidity of the walls which is well adapted to the high temperatures to which the appliance is subjected. Thus all distortion and deformation is avoided without obscuring the luminous emission at the lines of contact of the reliefs.

With regard to enclosure 4: this is the enclosure of combustion and infrared emission. It is identical to the diffusion enclosure 2, both in its dimensions and its ribs and in the percentage of empty space according to which it is perforated. The unit cross-section of the perforated holes is also identical and between 0.50 and 0.70 mm². To the two functions already described for the enclosure 2 acting as a flame trap barrier and as an enclosure for the passage of the ashes of the ambient dusts sucked in with the primary air of the air-gas flow, is added that of obtaining a multitude of combustion points corresponding to the dimensional characteristics of the emitter.

During the lighting of the appliance, the fineness and the blue-violet colour of the combustion layer of the air-gas flow which is produced close to the external surface of this combustion enclosure shows that the ideal conditions of good carburation, regular in all respects, are combined. Rapidly the reddening of the surface of this enclosure 4 is generated as a result of its constitution with low inertia.

The infrared emission which results from this has the benefit consequently of the same surface regularity and homogeneity.

The securing of this enclosure 4, fitting onto enclosure 3, should meet the same requirements of "tightness" as enclosure 2, for the same reasons, as the crossing of its wall by the air-gas flow before its inflammation should only take place exclusively via the calibrated gaps over its entire surface. The temperature of this enclosure (4) being particularly raised, and the pressure low, no parasitic fissure of greater size than the calibrated gaps, whether in length or in width, can be accepted. For this reason, this infrared emission enclosure 4 is also crimped in the upper plate and its construction sutures are carefully closed.

The raised ribs, stamped on its walls are identical to those of enclosures 3 and 2 and fulfill the same functions of maintaining the spacing with enclosure 3 and of preventing deformation in heat.

With regard to enclosure 5: it is on the outside, the last enclosure termed of second confinement and amplification of the infrared emission.

There exists in document EP 0 382 286 in the name of the applicant an enclosure which is identical in its shape but not in its function. In document SP 0 382 286 only two conical enclosures are used:

the one of diffusion, in form and function different from those of the present description, is responsible for projecting at a distance and at high or average pressure the air-gas flow, the other, similar to enclosure 5 of the present description, is capable, as a result of sufficient pressure, of receiving at a distance the inflamed air-gas flow and of producing directly the entirety of the nominal infrared emission on its single wall. The above-cited patent with two enclosures is thus not adapted to the problem posed by very low nominal pressures, the combustion and radiation conditions being degraded by the insufficient speed of projection of the air-gas flow which, in the case of that patent, is inflamed between the two enclosures, which is not the case in the present invention.

In the present invention, on the contrary, this last enclosure can not only recoup, as in prior art, a portion of the non-radiant heat which would be lost in front of the plate or the infrared emission netting, but, what is new, this enclosure 5 because of its particular characteristics of construction and positioning can also fulfill a confinement function making possible maximum recuperation of the heat which would be lost, this confinement being designed not to affect the quality of combustion on the external surface of the infrared emission enclosure 4. These specific confinement conditions realized by enclosure 5, positioned as described below, greatly amplify the temperature between enclosures 4 and 5. The effect obtained is a shortening of the wavelengths of the infrared emission producing a rise in the electromagnetic frequency. This elmetromagnetic over excitation increases in its turn the level of infrared energy exchanged continuously, from the one to the other and vice versa, via the walls of these two parallel enclosures at all points.

To obtain this synergy of the two enclosures 4 and 5, the present design thus provides the combination at the two following parameters:

the perforated surface of wall 5 does not exceed 1.6 times the perforated surface of wall 4 with a range from 1.2 to 1.6;

the spacing of these two walls is adjustable depending on the value of the pressure of the gas supply. This with the aim of giving to the spacing between these two enclosures 4 and 5 the value adapted to the volume of optimum confinement which can be greater it the gas pressure is higher. As an indication, in the embodiment described, for a pressure of between 20 and 30 mbar, this spacing is of the order of 8 mm.

A spacing fixed by construction would cause, for pressures not in keeping with this spacing, parasitic resonant quivering whilst the present emitter according to the invention is perfectly silent. The fitting of this last enclosure 5 can be effected, as in the embodiment described, by adjustable-height lugs 9 fixing it to the upper plate 6b, depending on the model of the appliance and according to the nominal gas pressure for which it is intended. Finally, as for the other enclosures, ribs in stamped relief, or any other kind or stiffening, prevent any deformation at high temperature.

The detailed description of the preceding embodiment is not restrictive in respect of the material means of ensuring the functions of enclosures 2 and 3 or in respect of other geometries of the emitter according to the applications chosen. An equivalent means can indeed be used to ensure the functions;

a) of enclosure 2:
diffusion of the air-gas flow,
flame trap barrier,
protection against airflows;

b) of enclosure 3:
thermal protection,
first confinement on the internal side of enclosure 4,
protection against airflows.

Figure 5:
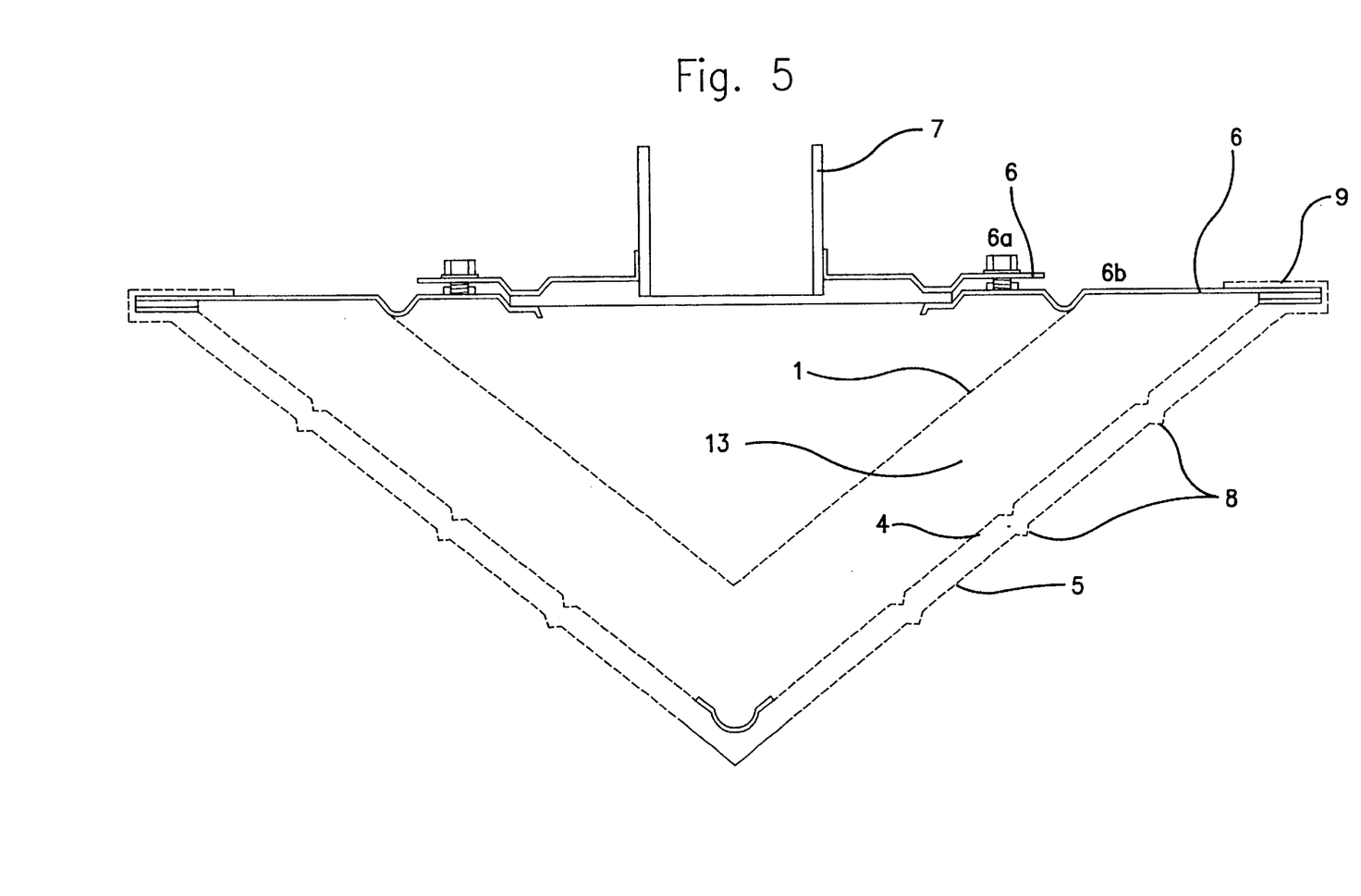
FIG. 5 is a schematic cross-sectional view of a tenth embodiment of an emitter according to the invention.

These functions can be efficiently fulfilled by arranging between enclosures 1 and 4 a permeable mat 13 formed from refractory fibres, as represented on FIG. 5, such as for example metallic alloy wool which is a inoxidizable, refractory and non-porous. This mat is then packed in an appropriate manner between enclosures 1 and 4. The use of this means instead of and in place of these enclosures 2 and 3 is particularly economic, the industrial strip manufacture of this metallic tow which is inoxidizable and refractory being a matter of standard methods.

In the case where this mat 13 is used, the dimensional characteristics of the distribution enclosure 1 can be less rigorous then those described previously, and it can be advantageous to increase the surface of revolution of the said enclosure 1 in such a way as to limit the thickness of the mat 13 resting between this enclosure 1 and enclosure 4 to a value sufficient to ensure the functions already described of enclosures 2 and 3 for which it in substituted.

The surface of revolution of enclosure 1 can be taken to a size ratio of 3/6 to 5/6 with the surface of revolution of enclosure 4.

The perforated surface of enclosure 1 can then be limited to 30% instead of 40% with basic holes remaining of the order of 3 to 3.5 mm$^2$ of unit cross-section.

Experience shows that an emitter according to the invention, realised with this means equivalent to the conjunction of enclosures 2 and 3, possesses the same qualities of combustion, radiation, protection against internal combustion, resistance to wind and of silence. As far as other geometries of the emitter are concerned, they can be realised according to the fundamental criteria of the invention.

Figure 2A:
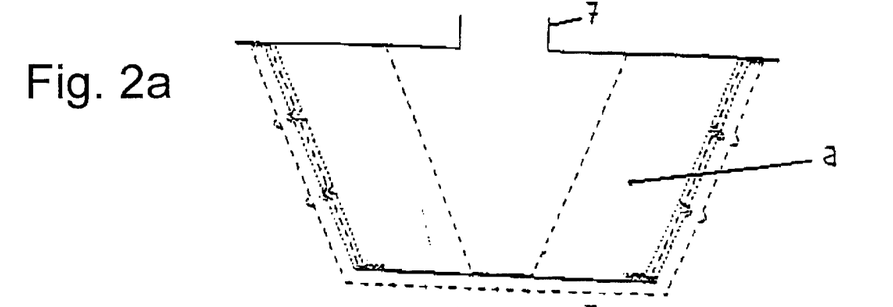
FIGS. 2a, 2b, 2c, 2d are schematic cross-sectional views of a second, third, fourth and fifth embodiment of an emitter according to the invention, respectively.
Figure 2B:
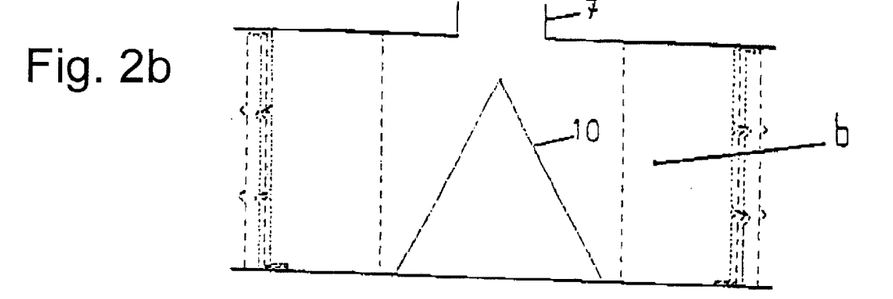
Figure 2C:
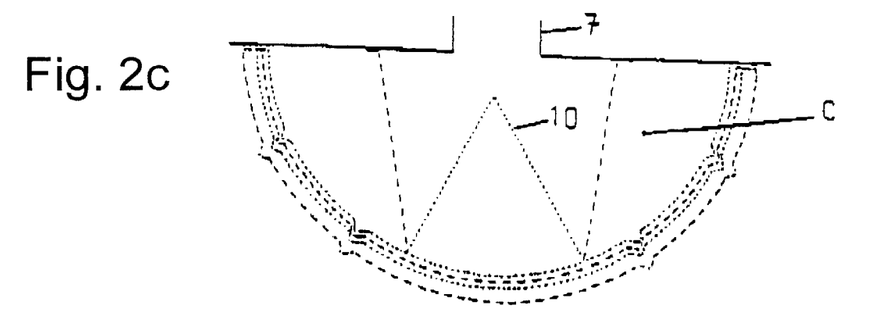
Figure 2D:
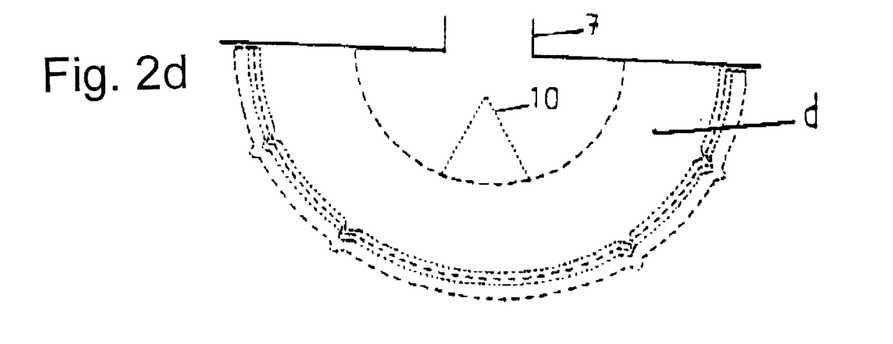
Figure 6A:
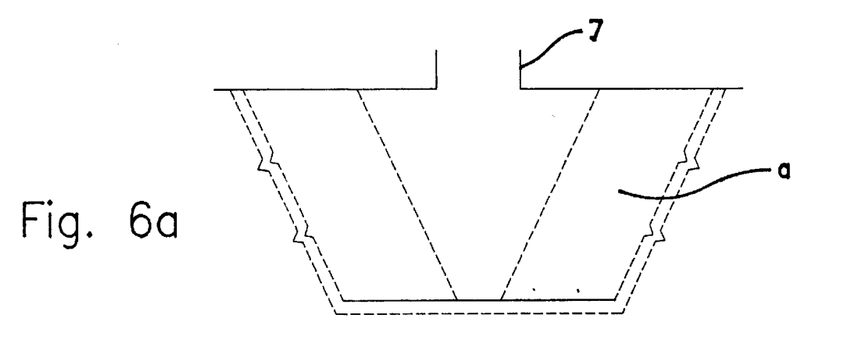
FIGS. 6a, 6b, 6c are schematic cross-sectional views of an eleventh, twelfth and thirteenth embodiment of an emitter according to the invention, respectively.
Figure 6B:
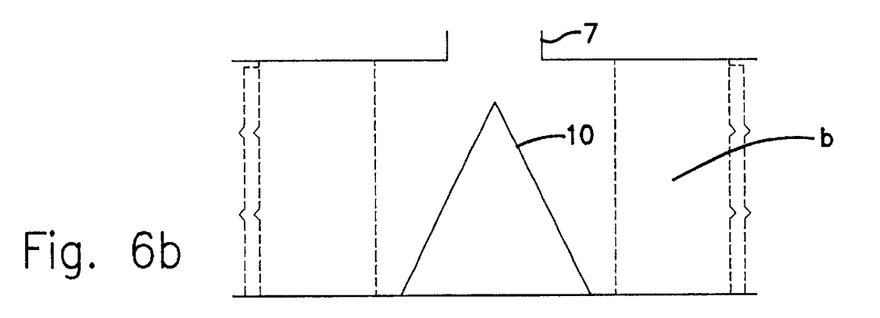
Figure 6C:
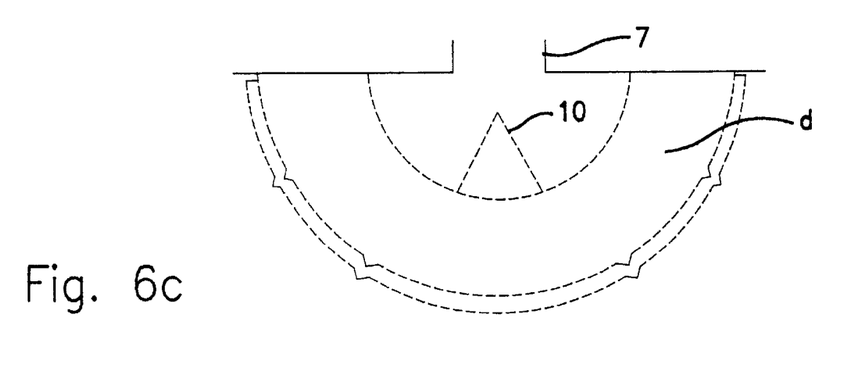

By way of example one can mention various geometries which lead themselves well to the design of the appliance both in the case where the opening 7 leads the air-gas flow from the top to the bottom as in the case where it leads said f low from the bottom to the top:

a) for the geometries leading the air-gas flow from the top to the bottom, as represented on the figures:
the truncated-cone shape of enclosures 1, 2, 3, 4 and 5 as represented on FIG. 2a and of enclosures 1, 13, 4 and 5 as represented on FIG. 6a, if one wants to be limited to oblique radiation;
the vertical cylindrical shape of enclosures 1, 2, 3, 4 and 5 as represented on FIG. 2b, or FIG. 6b, if one wants to favour horizontal radiation;
the hemispherical shape as represented on FIGS. 2c, 2d and 6d.

Figure 3:
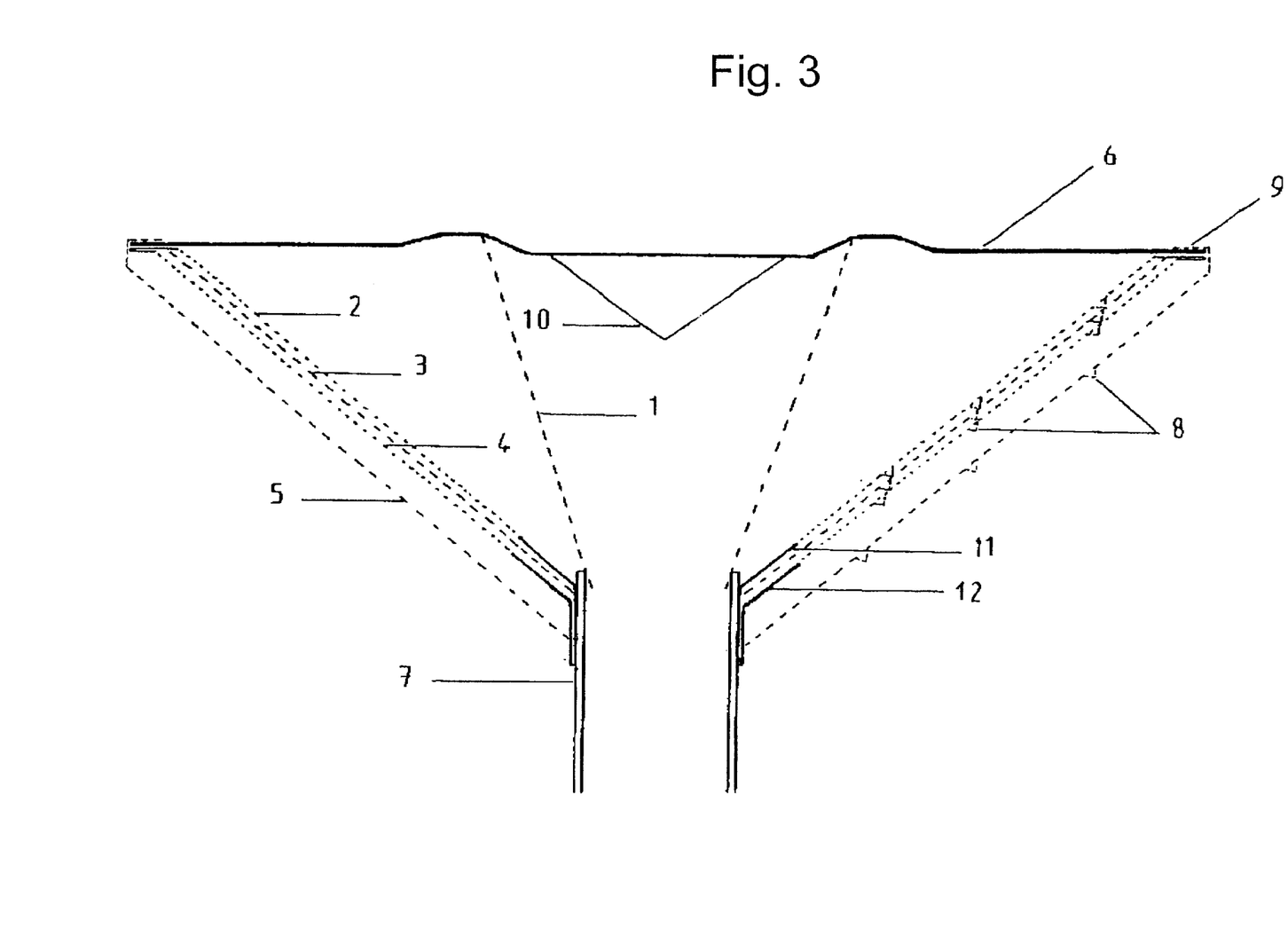
FIG. 3 is a schematic cross-sectional view of a sixth embodiment of an emitter according to the invention.
Figure 4A:
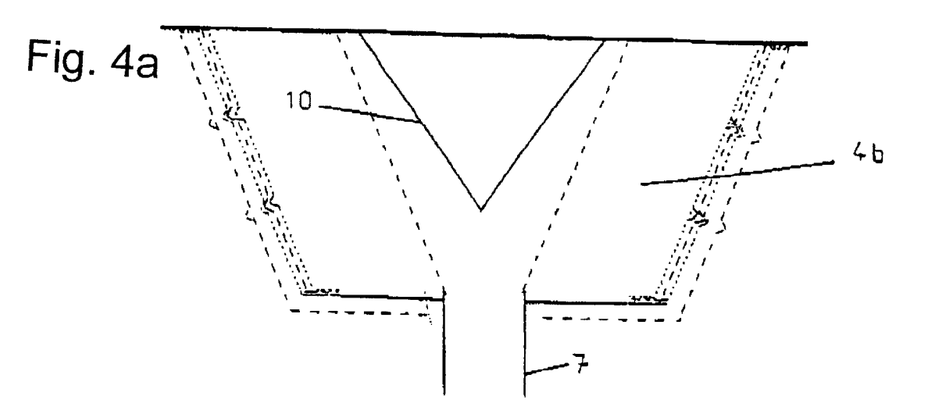
FIGS. 4a, 4b, 4c are schematic cross-sectional views of a seventh, eighth and ninth embodiment of an emitter according to the invention, respectively.
Figure 4B:
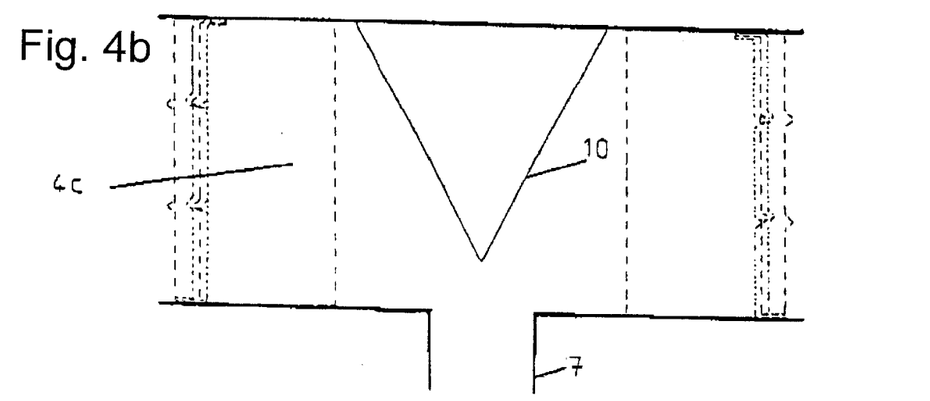
Figure 4C:
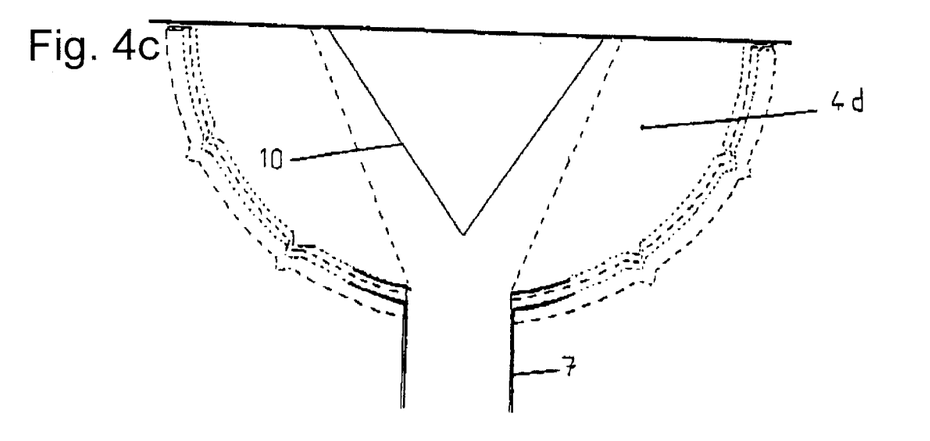
Figure 7:
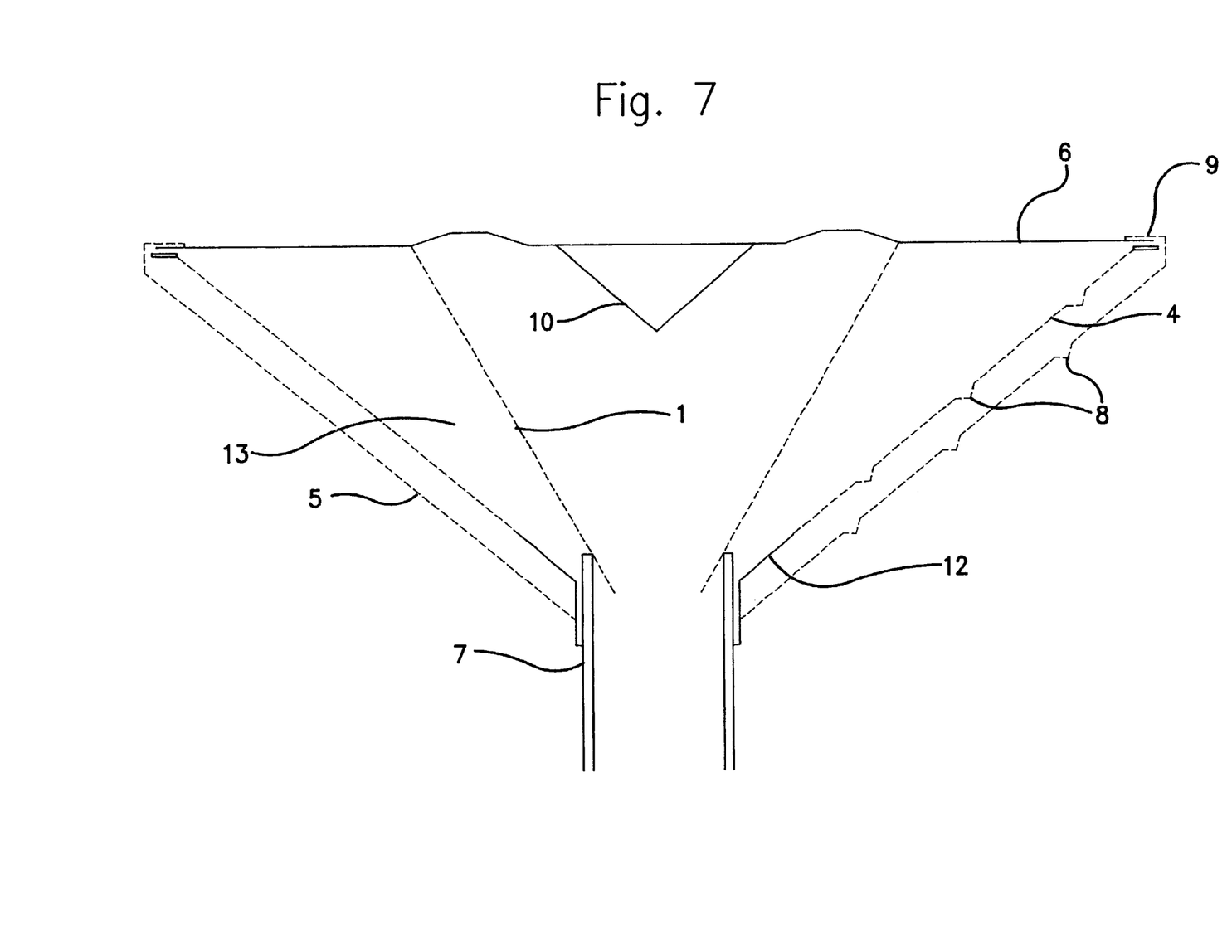
FIG. 7 is a schematic cross-sectional view of a fourteenth embodiment of an emitter according to the invention.
Figure 8A:
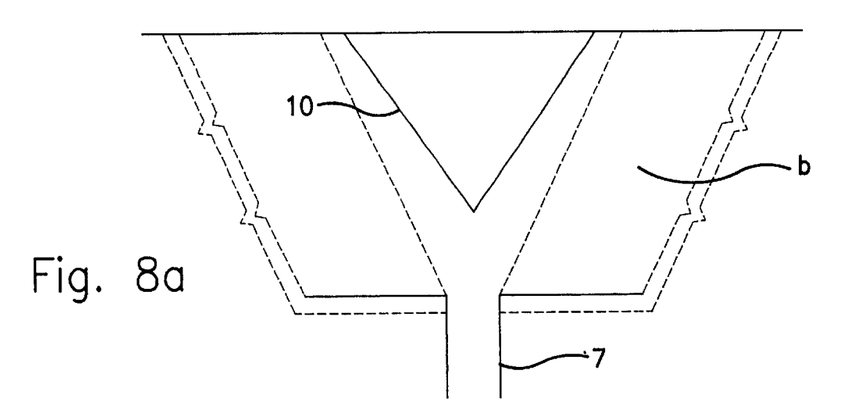
FIGS. 8a, 8b, 8c are schematic cross-sectional views of a fifteenth, sixteenth and seventeenth embodiment of an emitter according to the invention respectively.
Figure 8B:
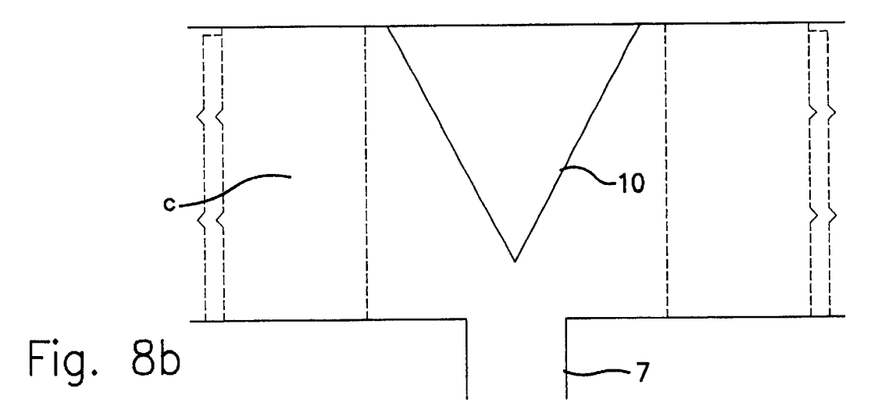
Figure 8C:
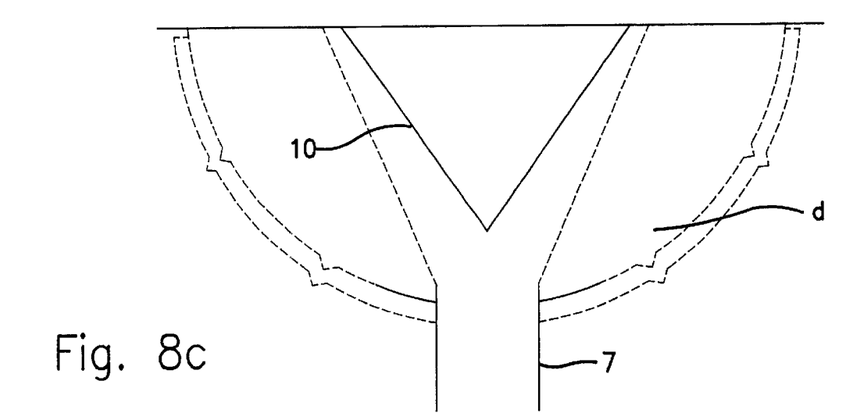

In the geometries according to FIGS. 2b, 2c and 2d with enclosures 1, 2, 3, 4, and 5 which are vertical (FIG. 2b) or hemispherical (FIGS. 2c and 2d), it is advantageous to provide inside the distribution enclosure 1 a pre-distributor 10 which is solid or finely perforated and in an inverse conical shape with the apex towards the top to pre-orient the air-gas flow in a uniform manner towards the diffusion enclosure 2. The same is true for the geometries according to FIGS. 6b and 6d with enclosures 1, 13, 4, 5. This combination is a means giving a result equivalent to that obtained directly by the single conical distributor 1 of the embodiment described above.

b) For the geometries leading the air-gas flow from the bottom to the top:
the truncated-cone shape according to FIG. 3 or 4b of enclosures 1, 2, 3. 4 and 5, and according to FIGS. 7 and 8b of enclosures 1, 13, 4 and 5 if one wishes to be limited to oblique radiation.
the vertical cylindrical form according to FIG. 4c of enclosures 1, 2, 3, 4 and 5 and according to FIG. 8c of enclosures 1, 13, 4 and 5 if one wants to favour horizontal radiation.

the hemispherical shape according to FIG. 4d of enclosures 2, 3, 4, and 5 and according to FIG. 8d of enclosures 4 and 5 with the circular base at the top and open dome with the dimension of the opening tube at the bottom. In the above-mentioned geometries according to FIGS. 3, 4b, 4c, 4d it is advantageous to provide inside the distribution enclosure 1 a pre-distributor 10 which is solid and in an inverse conical shape (apex towards the bottom) to pre-orient the air-gas flow in a uniform manner towards the diffusion enclosure 2. The base of this pre-distribution cone rests on the lower face of the plate, then tall in its centre, concentric with the distribution enclosure 1.

This combination is a means giving a result equivalent to that obtained directly by the single conical distributor 1 of FIG. 1 corresponding to the embodiment described above. Moreover in these configurations of the type of FIGS. 3 and 4, the central opening tube 7 is integrated into enclosures 2 and 4 by means ensuring that the junction between said enclosures 2 and 4 and opening 7 is airtight, such as for example the means represented on FIG. 3, i.e. two hollow tulip-shaped fittings 11 and 12, the flared portion of each of which is carefully connected at its respective junction with the lower edge of the perforated wall of each of enclosures 2 and 4. These two tulip-shaped fittings are then fitted the one inside the other, the corollas respecting the spacing described above between these two enclosures.

The respective tubular and cylindrical portions of each of these two tulip-shaped fittings are on the other hand perfectly joined in this interlocking. The connection and fitting to opening 7 should meet the same conditions of airtightness. In the case of the configurations according to FIGS. 7 and 8d of enclosures 1, 13, 4 and 5, a single tulip-shaped fitting is sufficient.

In summary, from numerous viewpoints, the infrared emitter according to the invention for functioning at very low pressure presents advantages amongst which one an mention:

- a range of electromagnetic wavelengths positioning it in the middle of the spectrum of the useful heat of the sun for the well-being of living creatures;
- a radiation output of the order of 70%;
- a wind resistance which makes it possible to accept, without extinction, airflows of more than 2 meters/second;
- dust can be removed from it with air without any fear of the jets of compressed air of 7 to 8 bars, contrary to the appliances with ceramic plates on which it is recommended not to exceed 2 bars;
- it may also be washed in water since it is realised in an inoxidizable and non-porous material;
- it is easy to install, without any heavy suspension or raising structure, as a result of its low weight in relation to its calorific power.

These differences themselves explain the economic character of this infrared gas heating emitter designed to accept without handicap a gas supply at very low pressure without recourse to an electro-mechanical propulsion device for the air-gas mixture.

What is claimed is:

1. Infrared emitter with luminous radiation comprising:
   a supply of gas at very low pressure and of primary atmospheric air via a venturi, said supply comprising:
   at least one gas injector,
   an injector holder,
   a safety valve, and
   a gas supply connector,
   the infrared emitter further comprising:
      a geometrical structure comprising at least one first (1), second (2), third (4) and fourth (5) concentric enclosure,
      a substantially horizontal upper plate (6) below which the at least first (1), second (2), third (4), fourth (5) enclosures are fixed concentrically to said plate so that the first enclosure is inside the second enclosure, the second enclosure is inside the third enclosure, and the third enclosure is inside the fourth enclosure,
      a central opening (7) leading an air-gas flow perpendicularly to said plate, into an interior space created by the first enclosure (1) and
      a fifth concentric enclosure (3) arranged between the second (2) and third (4) enclosures;
         wherein the first enclosure (1) has a cross-section of a base of the first enclosure fixed to the upper plate (6) in a size ratio of 4 to 6 with a cross-section of the opening (7), the first enclosure having a surface or revolution in a size ratio of 1/4 to 1/5 with a surface of revolution of the second enclosure (2), the first enclosure having a percentage of perforated surface in relation to a total surface of the first enclosure in the order of 40% with basic holes of the order of 3 to 3.5 mm² of unit cross-section,
         the second enclosure (2) having a surface of revolution in a size ratio of 4 to 5 with the first enclosure (1), the second enclosure having a total surface of perforated parts in a size ratio of 2 to 3 with a total surface of the perforated parts of the distribution enclosure (1), the second enclosure having a basic cross-section of 0.50 to 0.70 mm² for each of the holes constituting the perforated portion, the second enclosure having a manner of fixing which ensures an airtight connection to the upper plate (6),
         the fifth enclosure (3) having a surface of revolution substantially identical to that of the second enclosure (2), the fifth enclosure having a total surface of the perforated parts in a size ratio of 1.2 to 1.6 with the total surface of the perforated parts of the second enclosure (2), the fifth enclosure having a basic cross-section of the order of 3 to 4 mm² for each of the holes of perforated surfaces,
         the third enclosure (4) having a surface of revolution in a size ratio of 4 to 5 with the first enclosure (1), the third enclosure having a total surface of perforated parts in a size ratio of 2 to 3 with a total surface of the perforated parts of the distribution enclosure (1), the third enclosure having a basic cross-section of 0.50 to 0.70 mm² for each of the holes constituting the perforated portion, the third enclosure having a manner of fixing which ensures an airtight connection to the upper plate (6),
         the fourth enclosure (5) comprising;
            a total perforated surface in a size ratio limited to a value of 1.2 to 1.6 times the total perforated surface of the third enclosure (4), the fourth enclosure having a spacing from the third enclosure (4) which is adjustable, and the fourth enclosure having adjustable mounting lugs (9).

2. Infrared emitter with luminous radiation comprising:
   a supply of gas at very low pressure and of primary atmospheric air via a venturi, said supply comprising:

at least one gas injector, an injector holder, a safety valve, and a gas supply connector, the infrared emitter further comprising:

a geometrical structure comprising at least one first (1), second (2), third (4) and fourth (5) concentric enclosure, a substantially horizontal upper plate (6) below which the at least first (1), second (2), third (4), fourth (5) enclosures are fixed concentrically to said plate so that the first enclosure is inside the second enclosure, the second enclosure is inside the third enclosure, and the third enclosure is inside the fourth enclosure, a central opening (7) leading an air-gas flow perpendicularly to said plate, into an interior space created by the first enclosure (1), a fifth concentric enclosure (3) arranged between the second (2) and third (4) enclosures, wherein each of the first through fourth enclosures has on a surface of revolution over 360° lateral, oblique, vertical or hemispherical walls formed from an inoxidizable, non-porous refractory material formed to be permeable and non-porous and which turns red with heat, wherein the second enclosure (13) includes a permeable mat of refractory fibres which are inoxidizable and non-porous, inserted between the first enclosure (1) and the third enclosure (4), and wherein a surface of revolution of the first enclosure is in a size ratio of the order of 3.6 to 5.6 with a surface of revolution of the third enclosure (4), a perforated surface of the first enclosure being 30%, the first enclosure having basic holes of 3 to 3.5 mm² of unit cross-section.

3. Infrared emitter with luminous radiation comprising:

a supply of gas at very low pressure and of primary atmospheric air via a venturi, said supply comprising:

at least one gas injector, an injector holder, a safety valve, and a gas supply connector, the infrared emitter further comprising:

a geometrical structure comprising at least one first (1), second (2), third (4) and fourth (5) concentric enclosure, a substantially horizontal upper plate (6) below which the at least first (1), second (2), third (4), fourth (5) enclosures are fixed concentrically to said plate so that the first enclosure is inside the second enclosure, the second enclosure is inside the third enclosure, and the third enclosure is inside the fourth enclosure, an adjustable spacing being arranged between the third (4) and fourth (5) enclosures, a central opening (7) leading an air-gas flow perpendicularly to said plate, into an interior space created by the first enclosure (1), wherein a slight spacing of the second (2), fifth (3) and third (4) enclosures is provided, diameters of the holes and of a proportion between the holes of the perforated surfaces of the second, third, and fifth enclosures being alternated, a fibrous buffer of the second enclosure being arranged against an internal face of the third enclosure (4) with holes of small diameter in a perforated surface thereof.

* * * * *